(12) United States Patent
Janz

(10) Patent No.: US 6,533,322 B2
(45) Date of Patent: Mar. 18, 2003

(54) REROUTING DEVICE FOR A SEAT BELT

(76) Inventor: Norbert Janz, Starstrasse 21, D-14612 Falkensee (DE)

( * ) Notice: Subject to any disclaimer, the term of this patent is extended or adjusted under 35 U.S.C. 154(b) by 0 days.

(21) Appl. No.: 09/894,868

(22) Filed: Jun. 28, 2001

(65) Prior Publication Data

US 2002/0011749 A1 Jan. 31, 2002

(30) Foreign Application Priority Data

Jun. 28, 2000 (DE) .......................................... 100 32 803

(51) Int. Cl.[7] .............................................. B60R 22/24
(52) U.S. Cl. ....................... 280/808; 297/483; 24/163 R
(58) Field of Search .............................. 280/808, 801.1; 297/483, 468; 24/163 R, 197, 198

(56) References Cited

U.S. PATENT DOCUMENTS 4,527,313 A * 7/1985 Sylven et al. ............... 297/483
6,019,846 A * 2/2000 Graf et al. ................... 118/414

FOREIGN PATENT DOCUMENTS

| DE | 195 15 562 | | 10/1998 |
| DE | 198 10 577 A1 | | 9/1999 |
| DE | 299 15 058 | | 1/2000 |
| DE | 199 13 423 | * | 5/2000 |
| EP | 0 078 940 | * | 5/1983 |
| GB | 2 255 897 | | 11/1992 |

* cited by examiner

Primary Examiner—Peter C. English
(74) Attorney, Agent, or Firm—Herbert Dubno

(57) ABSTRACT

A rerouting device for a seat belt has a friction-reducing coating composed of a fluoropolymer matrix containing reinforcing substances dispersed therein and having a thickness of at most 100 $\mu$m.

13 Claims, 2 Drawing Sheets

REROUTING DEVICE FOR A SEAT BELT

FIELD OF THE INVENTION

My present invention relates to a rerouting device for a safety belt and, in particular, for a seat belt of a vehicle and which is adapted to be mounted on a support element and the vehicle and to have a seat belt guided therethrough in changing directions between the belt buckle and hence the user, and the device from which the seat belt pulls out and which locks the seat belt in the case of an accident.

Such a rerouting device is commonly provided with an elongated eye through which the seat belt runs and which can have a riding surface against which the seat belt bears when the seat belt is tightened.

BACKGROUND OF THE INVENTION

Rerouting devices of the aforementioned type are widely used in automobiles and the seat belt is usually threaded through the eye. The rerouting device in changing directions between the individual to be protected and the reserve from which the seat belt can be drawn and which may be provided with a locking unit adapted to grip the seat belt in the case of an accident.

Such a rerouting device can comprise a sheet steel body which can be stamped to form riding surfaces along which the seat belt is guided as it is pulled through the eye in one or the other direction.

The rerouting device is widely used for so-called three-point seat belts in automotive vehicles and can be mounted, for example, on the B-column of the vehicle and can then pivot to accommodate movement of the seat belt and the individual.

The rerouting device is usually subject to stress in the case of an accident and the substantial deceleration of the vehicle which results therefrom and must be capable of holding the seat belt against the mass of the person. The belt tension, tautness and belt-force limiting devices affect the load applied to the rerouting device. It has been proposed to provide a prefabric coating, for example a chromium coating, for belt riding surfaces of such devices to reduce the friction resistance of the sliding of the belt in the device. Such friction reduction permits the belt to slide more freely in the rerouting device and prevents overheating and hang-up of the belt in the device, even in a crash situation when relatively high relative speeds of the belt and the rerouting device can occur. Excessive heating not only creates a risk of damage to the seat belt by a melting thereof but also can result in injury of the belted individual. However, the rerouting device in that case has unsatisfactory values of the friction coefficient although it does have good wear resistance and a long useful life.

It is also known to provide rerouting elements with metal cores and a relatively thick plastic jacket. The plastic jacket forms the belt-riding surfaces. The friction coefficient of this plastic sheet or jacket is less than that of a chromium layer. Moreover, the plastics which have been used tend to have low temperature resistance and thus tend to wear readily and to be useless when heated to a significant extent as can happen in the case of a crash when the belt passes through the rerouting device at high speed. In these cases the plastic can soften and even melt locally. These effects are detrimental to the heating properties of the belt in the rerouting device and can represent drawbacks as well when the seat belt is to be effective in a crash. The plastic jacket tends to have small cracks which may be insignificant on fabrication but which, in the case of a crash, are subjected to a high degree of loading and deterioration or full breakaway. The resulting edges of the remaining plastic or metal edges which are liberated can contribute to the tearing of the belt and in extreme cases can result in separation of the belt.

DE 195 15 562 describes a rerouting device that utilizes a metal rerouting element to which a thick synthetic resin coating is applied and which has a throughgoing recess in the region of the outer edge of the metal part. This recess forms a weakened region whose rupture in the case of a crash does not affect the function of the plastic coating since the rupture does not occur in the region of belt travel. The rupture does not, however, solve the problem of cracks in the plastic part. Furthermore, when the plastic covering is relatively thick as described, thermal conduction of friction heat away from the coating is unsatisfactory in the case of a crash.

DE 299 15 058 describes a sheet steel rerouting element with a coating for reducing resistance. The coating materials here described include polytetrafluoroethylene. While this material has a high temperature resistance, its wear resistance leaves much to be desired and for long-term use, the material is scarcely suitable.

OBJECTS OF THE INVENTION

It is the principal object of the present invention to provide an improved rerouting device for seat belts and the like whereby the aforementioned disadvantages can be avoided.

More particularly, it is an object of the invention to provide a rerouting device which has a long useful life, low heating friction coefficients between the guide surfaces of the rerouting devices and the belt and which nevertheless has good resistance to high temperatures and an excellent ability to dissipate heat.

SUMMARY OF THE INVENTION

These objects are attained, in accordance with the invention, in a rerouting device for a seat belt for a motor vehicle, particularly a passenger vehicle, which comprises:

a sheet steel body formed with an elongated eye through which a seat belt can be passed, a belt riding section around which the seat belt can be bent and which is engaged by the seat belt as it passes through the eye, and a portion adapted to be fixed to a supporting portion of a vehicle body; and a friction-reducing synthetic resin coating at least on seat belt-engaging surfaces of the belt riding section, the synthetic resin coating being composed of a fluoropolymer matrix containing reinforcing substances dispersed therein and having a thickness of less than 100 $\mu$m. The fluoropolymer matrix consists preferably of polytetrafluorethylene. The reinforcing substances are particles of materials having a low friction coefficient. A possible reinforcing substance with a low friction coefficient is molybdenum disulfide.

Preferably the fluoropolymer matrix reinforced with reinforcing substances incorporated in the matrix can be of the type marketed as Chem Coat 1012, or Temp Coat 1008 F, by Impregion Deutschland GmbH. The fluoropolymer matrix provides an antifriction coating with sufficient temperature resistance and the reinforcing substances serve to ensure an especially high wear resistance and thus significantly higher useful lives than with the earlier fluoropolymer coatings. The coating of the invention, simply referred to hereinafter as a reinforced fluoropolymer system, has a friction coefficient against steel of less than 0.1. The coating preferably has a thickness of 15 to 80 μm. This low thickness ensures excellent heat transmission to the sheet steel body and dissipation of the heat generated by the belt upon a crash. In addition, the rerouting device with its reinforced fluoropolymer system emits significantly less noise as the belt is drawn through it than the prior art plastic coated rerouting devices.

The surface provided with the coating can have a non-uniform surface structure so that contact with the belt is limited and this can be obtained by sandblasting and shot-peening of the surface before coating.

The guide surface can be provided with an opening through which a roller extends, the roller journaled between lugs of the usual steel body. The curvature of the frame limits bounding the opening which can run into the curvature of the roller on which the seat belt is guided. The roller limits sliding friction between the fixed surfaces of the rerouting device and the belt to further reduce the frictional heat. The portion of the roller extending through the opening can make up more than 20% and preferably at least 40% of the surface on which the belt is guided.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
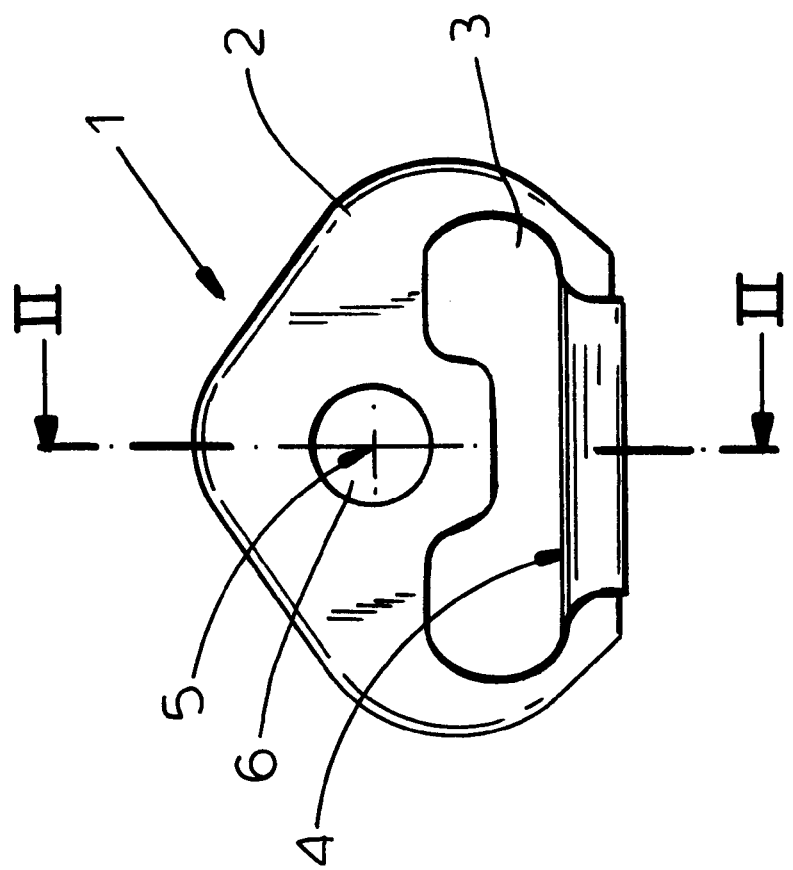
FIG. 1 is a plan view of a rerouting device for a seat belt.

FIG. 1 shows a rerouting device 1 for a seat belt which has a rerouting element 2 which can be stamped or otherwise formed from sheet steel and has an elongated belt eye or window 3 through which the seat belt passes and a section 4 on which the seat belt rides. This section 4 of the rerouting device can be referred to herein as the belt-riding section or the belt-contact section. This section 4 has a curved riding surface and the seat belt conforms to the configuration of the surface as it passes over it.

The rerouting device 2 is also provided with a bore 6 which is centered on the surface center of gravity or centroid 5 of the device. A belt or rivet or like fastener passing this bore can swingably secure the rerouting device to a supporting portion of the chassis, for example, the B-column of an automotive vehicle chassis.

Figure 2:
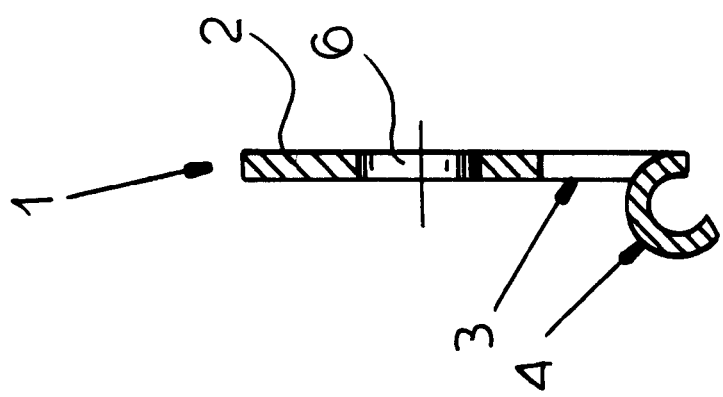
FIG. 2 is a cross section taken along the line II—II of FIG. 1.

In the embodiment of FIGS. 1 and 2, the belt-riding section 4 is coated with an antifriction coating of a reinforced fluoropolymer which greatly reduces the friction between the safety belt and the curved riding surface. The reinforced fluoropolymer system is comprised of a fluoropolymer matrix, preferably polytetrafluoroethylene, in which low-friction reinforcing substances are incorporated. The coating is thin and has a thickness of less than 100 μm. It is very smooth and can have a surface roughness Ra of less than 2 μm. Preferably the coating has a layer thickness of 18 to 80 μm which has been found to be optimum from a number of points of view including he heat conductivity to the support sheet steel surface.

The coating material can be applied as an electrostatic powder coating which can be subjected to a subsequent thermal treatment to fuse the deposited powder particles together and to bond them to the supporting surface. It may, however, also be applied as the wet lacquer or as a coating which is deposited by a fluidized bed process. Whichever the coating process used, it is such as to provide the thinnest possible coating which will have a durable antifriction result. It should however have a dense surface to protect the sheet steel support from corrosion.

Figure 3:
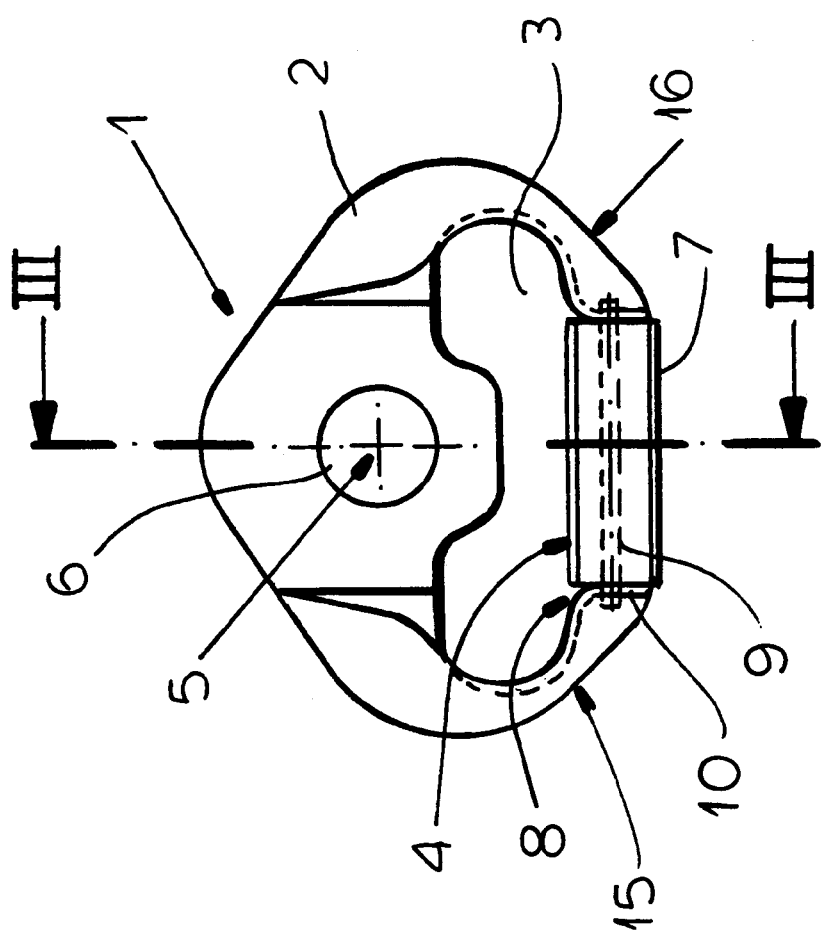
FIG. 3 is a view similar to FIG. 1 of another embodiment.
Figure 4:
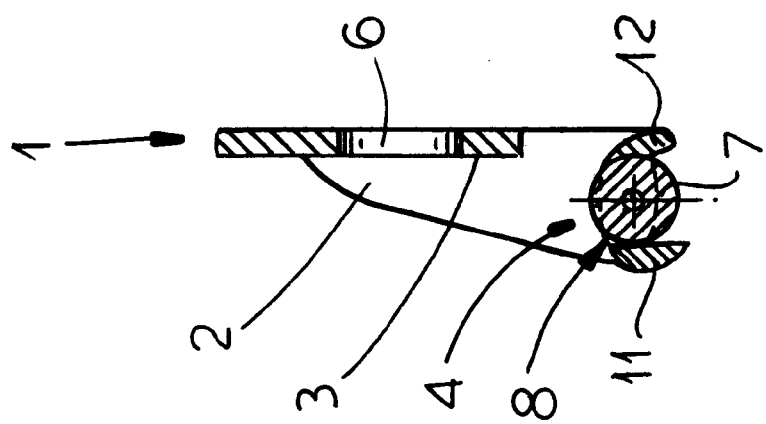
FIG. 4 is a cross sectional view through this embodiment along the line IV—IV of FIG. 3.

In the embodiment of FIGS. 3 and 4 in the region of the riding section 4, a roller 7 is journaled on a shaft or pin 9 and the shaft 9, in turn, can be rotatably mounted in a pair of lugs 10 flanking the ends of the roller 7. The roller 7 may have a width which is equal to that of the seat belt but in no event will be smaller than say one-half the width of the seat belt. The lugs 10 can be formed unitarily on the sheet steel rerouting element 2. The riding section 4 can be formed in the stamping of the rerouting element 2 initially as a tongue to which an arcuate shape is imparted so that members 11 and 12 flank the roller 7 longitudinally and have external curvatures which are continued by the surface of the roller 7 where the members 11 and 12 and the roller 7 are in engagement with the belt. The roller 7 is in engagement with the belt. The roller 7 is thus received in a recess 8 in the riding surface such that the contour of the roller continues the arcuate surfaces formed by members 11 and 12 which constitute frame segments flanking the roller 7 and with the curvature of the belt in this region. As a result the belt has a uniform bend where it passes around the frame members 11 and 12 and roller 7 between them.

The frame in which the roller 7 is enclosed is constituted by the longitudinal frame limbs 11 and 12 which are parallel to the axis of the roller 7 and the lugs 10 to which the frame limbs are connected. The frame imparts a high rigidity and strength to the region of the rerouting device engaged by the belt without requiring significant overdimensioning of the rerouting element. The roller 7 is so formed that in cross section perpendicular to its axle 9, it will make up approximately 40% of the riding surface for the belt. The riding surface is thus formed by that portion of the roller 7 exposed to the belt between the frame limbs 11 and 12 and the outer surfaces of the frame limbs 11 and 12.

While in the embodiments of FIGS. 1 and 2, the entire curved surface forming the riding surface is provided with the low-friction coating of the reinforced polymer system, in the embodiment of FIGS. 3 and 4 this coating is applied at least to the outer surfaces of the limbs 11 and 12. The friction against the rounded outer surfaces of the limbs 11 and 12 is thereby greatly reduced. The reinforcing substances can be such low-friction particles as particles of molybdenum disulfide. The reinforcing substances are uniformly distributed in the fluoropolymer matrix.

The preferred coatings are a reinforced fluoropolymer system of the type commercially known as Chem Coat 1012 or Temp Coat 1008 F, and marketed by the firm Impregion Deutschland GmbH. With this coating, the static friction coefficient against untreated normal steel of 0.09 can be obtained with a surface roughness of Ra=2 to 5 μm. The dynamic friction coefficient corresponds approximately to that static friction coefficient so that there is practically no slipstick effect. The coating can withstand temperatures of −45 to 260° C. and is particularly suitable for use with the present invention. Other reinforced fluoropolymer systems with similar characteristics can also be used.

It will be understood further that the entire rerouting device need not be provided with the plastic coating and that it is sufficient to limit the coating to those surfaces in contact with the seat belt, i.e. the riding surfaces.

To increase the adhesion of the plastic coating to the sheet steel body of the rerouting element, the sheet steel body can be subjected to a pretreatment prior to coating. The surfaces of the sheet steel body can be, entirely or only over the riding region, initially subjected to sandblasting and then to ball polishing (shot-polishing). As a result, the surface has a nonuniform surface structure which limits the full surface contact of the seat belt therewith, thereby resulting in a further reduction of the sliding friction of the seat belt against the riding surfaces of the rerouting device.

The rerouting device can be integrated completely in the B-column of an automobile. It can be invisible from the exterior, being wholly surrounded by the covering of the B-column except for the slot through which the seat belt emerges. Because of the location of the centroid of the surface or the surface center of gravity at the center of the pivot hole and the outer contours of the sheet steel body, the rerouting device has a very small inertia and can be fitted entirely in the B-column, the column or the D-column of an automobile. The surface center of gravity can be sufficiently close to the eye that the pivot radius is comparatively small for such integration in the supporting unit, for example, the B-column.

The dimensioning is selected to minimize the swing during the crash of the vehicle. The position of the bore in a preferred embodiment is such that the bore can intersect a straight line connecting the edges of the eye or slot through which the seat belt passes on the side of this eye or slot opposite that along which the riding surfaces are provided. The outer contours of the body of the rerouting device adjacent the location 10 can be somewhat flattened at 15 and 16 so that they define a radius which is smaller than the transverse dimension of the rerouting device which has been found to be particularly effective for integration of the device in the B-column. The flattening is such as may be called for by the maximum pivot angle of the device.

Preferably the belt riding section is so configured that it undergoes a slight elastic deformation under load which centers the seat belt on the riding surface in the case of a crash.

I claim:

1. A rerouting device for a seat belt, comprising:
    a sheet steel body formed with an elongated eye through which a seat belt can be passed, a belt riding section around which the seat belt can be bent and which is engaged by the seat belt as it passes through said eye, and a portion adapted to be fixed to a supporting portion of a vehicle body; and
    a friction-reducing synthetic resin coating at least on seat belt-engaging surfaces of said belt riding section, said synthetic resin coating being composed of a fluoropolymer matrix containing reinforcing substances dispersed therein and having a thickness of less than 100 $\mu$m.

2. The rerouting device defined in claim 1 wherein said seat belt-engaging surfaces of said belt riding section coated with said fluoropolymer matrix containing reinforcing substances have a nonuniform surface structure preventing full-surface contact of said seat belt therewith.

3. The rerouting device defined in claim 2 wherein said fluoropolymer matrix containing reinforcing substances is coated onto said surfaces after sand-blasting and shot-polishing thereof.

4. The rerouting device defined in claim 3 wherein said coating has a thickness of 15 to 80 $\mu$m.

5. The rerouting device defined in claim 4, further comprising a roller jounaled on said body between a pair of lugs formed thereon and in an opening in said belt riding section for engagement with said belt, said rerouting device having a contour in said belt riding section continuing a curvature of said roller.

6. The rerouting device defined in claim 5 wherein said roller has a portion projecting through said opening which makes up at least 20% of said surfaces in a cross section transverse to an axis of rotation of said roller.

7. The rerouting device defined in claim 6 wherein said portion projecting through said opening makes up at least 40% of said surfaces in said cross section transverse to the axis of rotation of said roller.

8. The rerouting device defined in claim 1 wherein said fluoropolymer matrix containing reinforcing substances is coated onto said surfaces after sand-blasting and shot-polishing thereof.

9. The rerouting device defined in claim 1 wherein said seat belt-engaging surfaces of said belt riding section coated with said fluoropolymer matrix containing reinforcing substances have a nonuniform surface structure preventing full-surface contact of said seat belt therewith.

10. The rerouting device defined in claim 1 wherein said coating has a thickness of 15 to 80 $\mu$m.

11. The rerouting device defined in claim 1, further comprising a roller jounaled on said body between a pair of lugs formed thereon and in an opening in said belt riding section for engagement with said belt, said rerouting device having a contour in said belt riding section continuing a curvature of said roller.

12. The rerouting device defined in claim 11 wherein said roller has a portion projecting through said opening which makes up at least 20% of said surfaces in a cross section transverse to an axis of rotation of said roller.

13. The rerouting device defined in claim 12 wherein said portion projecting through said opening makes up at least 40% of said surfaces in said cross section transverse to the axis of rotation of said roller.

* * * * *